US000001877H

United States Statutory Invention Registration [19]

[11] Reg. Number: H1,877

Van Etten et al. [45] Published: Oct. 3, 2000

[54] POLARIZATION DIVERSE PHASE DISPERSIONLESS BROADBAND ANTENNA

[75] Inventors: Paul Van Etten, Clinton; Michael C. Wicks, Utica, both of N.Y.

[73] Assignee: The United States of America as represented by the Secretary of the Air Force, Washington, D.C.

[21] Appl. No.: 06/841,375

[22] Filed: Mar. 5, 1986

[51] Int. Cl.[7] ..... H01Q 1/48

[52] U.S. Cl. ..... 342/188

[58] Field of Search ..... 343/846, 850, 343/853, 908, 795; 333/111, 117, 121, 123; 342/188, 361, 365, 366, 368

[56] References Cited

U.S. PATENT DOCUMENTS

| | | | |
|---|---|---|---|
| 3,015,101 | 12/1961 | Turner et al. | 343/848 |
| 3,509,465 | 4/1970 | Andre et al. | 325/373 |
| 3,618,104 | 11/1971 | Behr | 343/745 |
| 3,680,127 | 7/1972 | Richard | 343/708 |
| 3,987,458 | 10/1976 | Reggia et al. | 343/846 |
| 4,087,818 | 5/1978 | Kreutel, Jr. | 342/361 X |

FOREIGN PATENT DOCUMENTS

| | | | |
|---|---|---|---|
| 964458 | 7/1964 | United Kingdom | 343/908 |

OTHER PUBLICATIONS

T.C. Cheston et al., "Array Antennas", Radar Handbook, ed. M. I. Skolnik, McGraw–Hill, New York 1970 (pp. 11–1 thru 11–7).

*Primary Examiner*—Daniel T. Pihulic

*Attorney, Agent, or Firm*—William G. Auton; Donald J. Singer

[57] ABSTRACT

A multi-octave bandwidth antenna is disclosed which radiates with variable polarizations using: a metal ground plane, first and second blade antenna elements, first and second coaxial transmission line feeds, and a 180° hybrid coupler. The two blade antenna elements are fixed above the metal ground plane in proximity with each other, and fed respectively by the central conductors of the first and second coaxial transmission line feeds. The 180° hybrid coupler has a sum and difference port to control the polarization of waveforms of the antenna.

5 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GEOMETRY OF THE POLARIZATION DIVERSE PHASE DISPERSIONLESS BROADBAND ANTENNA.

THE POLARIZATION DIVERSE PHASE DISPERSIONLESS BROADBAND ANTENNA AND ITS' IMAGE

THE DUAL ANTENNA TO THE
POLARIZATION DIVERSE PHASE DISPERSIONLESS BROADBAND ANTENNA

THE TRANSMISSION LINE SLOT IN A METAL GROUND PLANE.

FACIMILE OF THE ANTENNA SURGE IMPEDANCE THROUGH THE TRANSMISSION LINE AND ANTENNA

DETAILS OF FEEDING THE POLARIZATION DIVERSE PHASE DISPERSIONLESS BROADBAND ANTENNA WITH A COAXIAL TRANSMISSION LINE

THE POLARIZATION DIVERSE PHASE DISPERSIONLESS BROADBAND ANTENNA WITH THE ELEMENTS FED IN PHASE TO PRODUICE A VARTICALLY POLARIZED WAVEFORM.

THE POLARIZATION DIVERSE PHASE DISPERSIONLESS BROADBAND ANTENNA WITH THE ELEMENTS FED IN ANTI PHASE TO PRODUCE A HORIZONTALLY POLARIZED WAVEFORM.

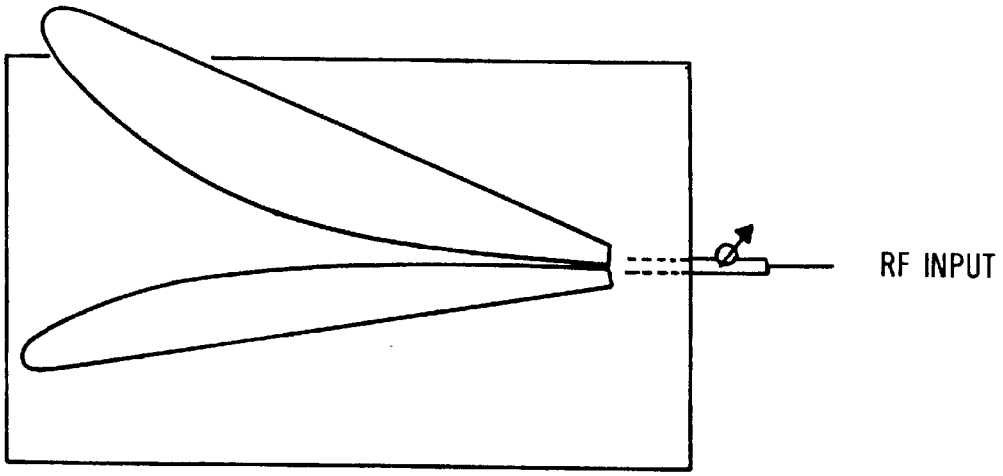

| VALUE OF PHASE SHIFT | RADIATED POLARIZATION |
|---|---|
| 0° | VERTICAL |
| 45° | ELLIPTICAL CW |
| 90° | CIRCULAR CW |
| 135° | ELLIPTICAL CW |
| 180° | HORIZONTAL |
| 225° | ELLIPTICAL CCW |
| 270° | CIRCULAR CCW |
| 315° | ELLIPTICAL CCW |
| 360° | VERTICAL |

THE POLARIZATION DIVERSE PHASE DISPERSIONLESS BROADBAND ANTENNA WITH A SINGLE 0° TO 360° PHASE SHIFTER WITH SELECTED VALUES OF PHASE SHIFT SETTING AND THE CORRESPONDING RADIATED POLARIZATION.

FIGURE 8

THREE DIFFERENT GEOMETRIES FOR CONSTRUCTION OF THE POLARIZATION DIVERSE PHASE DISPERSIONLESS BROADBAND ANTENNA

POLARIZATION DIVERSE PHASE DISPERSIONLESS BROADBAND ANTENNA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to broadband antennas, and more specifically to a multi-octave bandwidth antenna which will radiate and receive electromagnetic energy at UHF-Band, L-Band, C-Band, S-Band, X-Band, K-Band and beyond with variable radiated polarization.

The task of providing an antenna element which will radiate and receive over multi-octave bandwidths is alleviated, to some extent, by the following U.S. Patents, which are incorporated herein by reference:

U.S. Pat. No. 3,680,127 issued to D. J. Richard on Jul. 25, 1972;

U.S. Pat. No. 3,015,101 issued to E. Turner et al on Dec. 26, 1961;

U.S. Pat. No. 3,509,465 issued to Andre et al on Apr. 28, 1970; and

U.S. Pat. No. 3,618,104 issued to L. Behr on Nov. 2, 1971.

U.S. Pat. No. 3,618,104 discloses a broadband low-profile circularly polarized antenna having a form factor comprising a cornucopia-shaped element. U.S. Pat. No. 3,509,465 discloses a tunnel diode amplifier integrated into a printed circuit equiangular spiral antenna in which the antenna elements are used as a portion of the amplifier transmission line.

U.S. Pat. No. 3,680,127 discloses a tunable omnidirectional antenna having two loaded, concentric, semicircular radiating members. U.S. Pat. No. 3,015,101 discloses an antenna consisting of one or more elements each essentially a coplanar equiangular stub antenna with a folded over shorted base, the general configuration being that of a scimitar blade.

While the systems described above are exemplary in the art, the need remains to provide a multi-octave antenna element which has excellent time dispersion properties; and will radiate and receive at UHF-Band, L-Band, C-Band, S-Band, X-Band, K-Band and beyond, and radiates with variable polarization by shifting the phase of the input radio frequency (RF) signal. The present invention is intended to satisfy that need.

SUMMARY OF THE INVENTION

The present invention comprises a broadband antenna which will radiate and receive electromagnetic energy at UHF-Band, L-Band, C-Band, S-Band, X-Band, K-Band and beyond. In addition, this antenna has excellent time dispersion properties over a broadband of operation. The present invention consists of two radiating elements above a ground plane. The curvature of each of the radiating elements from the mouth to a point near the tip thereof is an arc of constant radius which results in a low voltage standing wave ratio. The antenna is fed with two coaxial transmission lines connected to the ground plane and to the antenna elements.

Variation in the polarization orientation is obtained by feeding the RF signals to the transmission lines using a 180° hybrid coupler which has a sum port and a difference port. When the RF is applied to the sum port, the elements are fed in phase and a vertically polarized waveform results. When RF is applied to the difference port, the elements are fed in anti-phase (180° out of phase) and a horizontal polarized waveform results.

When the same RF signal is applied to the sum and difference port, a 45° linearly polarized waveform is radiated. If one input is shifted by 90°, a circularly polarized waveform is radiated.

It is an object of the present invention to provide a broadband antenna which transmits and receives multi-octave electromagnetic energy.

It is another object of the present invention to radiate and receive at UHF-Band, L-Band, C-Band, S-Band, X-Band, K-Band and beyond.

It is another object of the present invention to radiate at variable polarizations including vertically polarized waveforms, horizontally polarized waveforms, and circularly polarized waveforms.

These objects together with other objects, features and advantages of the invention will become more readily apparent from the following detailed description when taken in conjunction with the accompanying drawings wherein like elements are given like reference numerals throughout.

DESCRIPTION OF THE DRAWINGS

FIGS. 6–8 illustrate the effects of phase shift on input radio frequency signals on the polarization of waveforms produced by the present invention;

DETAILED DESCRIPTION OF THE PREFERRED EMBODIMENT

The present invention is a multi-octave bandwidth antenna which will radiate and receive electromagnetic energy at UHF-Band, L-Band, C-Band, S-Band, X-Band, K-Band and beyond with variable radiated polarizations Two developments in the state-of-the-art which led to the present invention are disclosed in two patent applications of Michael C. Wicks and Paul Van Etten. The first is entitled "The Mono-Balde Phase Dispersionless Antenna" filed on Mar. 5, 1986, Ser. No. 06/841,376, now abandoned the disclosure of which is incorporated by reference. This antenna is composed of a metal ground plane with a Mono-Balde Antenna element fixed above it and achieves multi-decade bandwidth.

The second development is entitled "The Bi-Blade Century Bandwidth Antenna" filed on Mar. 5, 1986, Ser. No. 06/841,381, the disclosure of which is specifically incorporated by reference. This antenna achieves century bandwidth (i.e., 100) using a pair of blades fixed in proximity of each other and a coaxial transmission line feed.

The Polarization Diverse Phase Dispersionless Broadband Antenna, described in detail below, has several important properties which make it superior to available broadband antennas. Among these properties are: (1) the antenna has a large bandwidth; (2) the antenna has little or no phase dispersion; (3) the input VSWR (Voltage Standing Wave Ratio) of the antenna is extremely good (less than 1.2 to 1); (4) the antenna is polarization diverse, i.e., horizontally polarized, or vertically polarized, or circularly polarized, or elliptically polarized, and polarization diversity is obtained using only a single variable phase shifter; (5) the antenna is a nonresonant structure, which contributes to its broadband nature; (6) the antenna is ideally suited to being employed in a phased array, providing a large bandwidth, high gain, and good directivity; (7) the antenna is simple to construct and inexpensive to manufacture as compared to other broadband antennas.

Figure 1A:
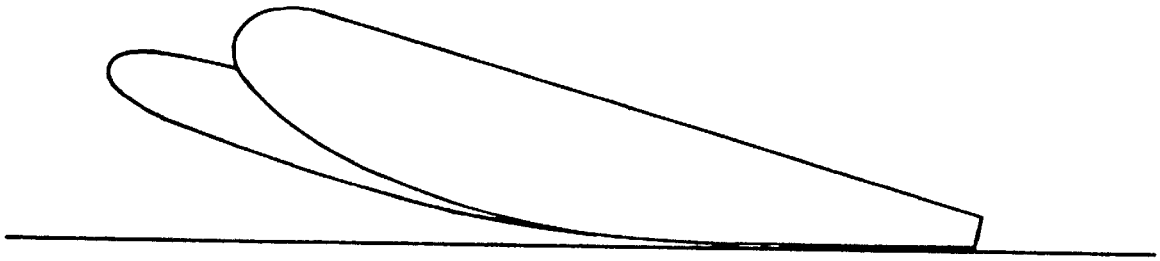
FIG. 1*a* is a side view of the antenna of the present invention.
Figure 1B:
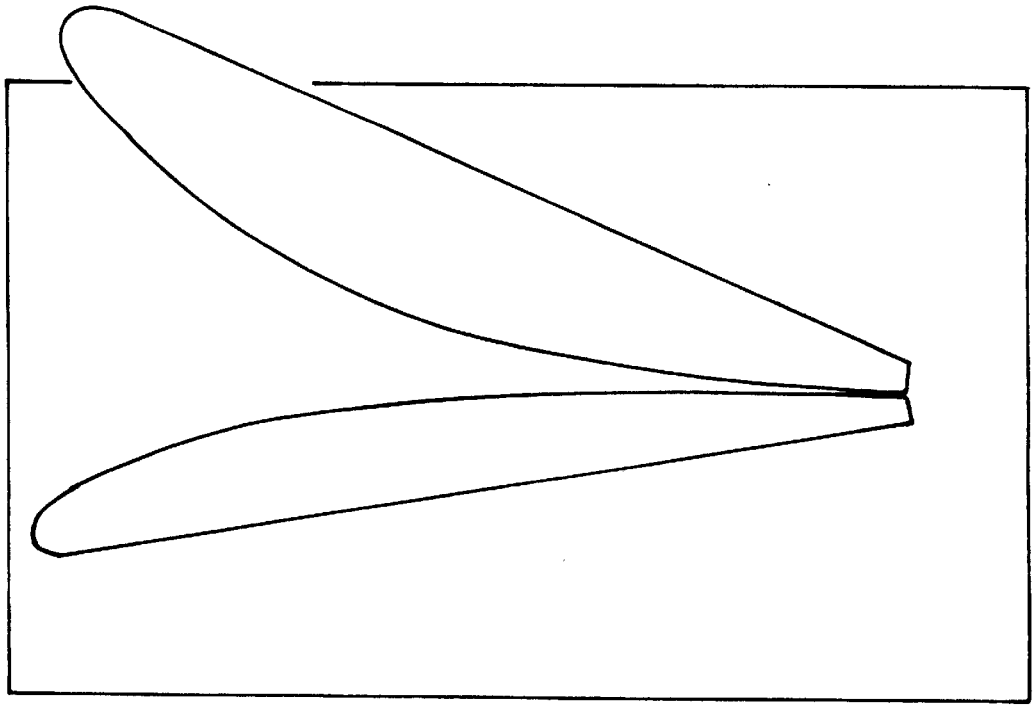
FIG. 1*b* is a plan view of the antenna of FIG. 1A.

The Polarization Diverse Phase Dispersionless Broadband Antenna is constructed with two radiating elements above a metal ground plane. The reader's attention is now directed towards FIGS. 1*a* and 1*b* which are mechanical schematics of an embodiment of the antenna of the present invention. FIG. 1*a* is a side view of the antenna; and FIG. 1*b* is a side view of the antenna of FIG. 1*a*. To understand the theory of operation of this antenna, the reader's attention is directed towards FIG. 2*a,* which illustrates: the broadband antenna of the present invention, and its image elements which are below the ground plane.

Figure 2A:
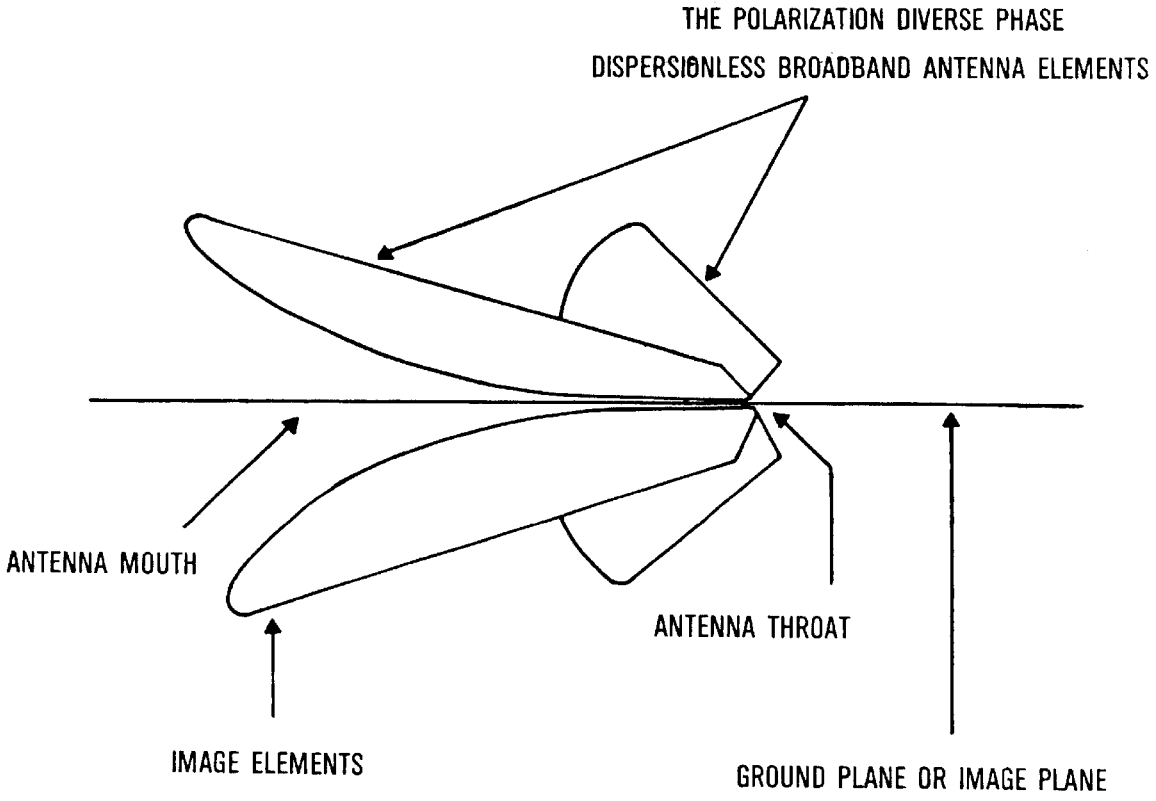
FIG. 2*a* is an illustration of the broadband antenna of the present invention and its image elements.

With FIG. 2*a* in mind, Image Theory is applied to the antenna of FIG. 1 by constructing a dual antenna. The construction of a dual antenna is accomplished by removing the ground plane 100 from the antenna of FIG. 2*a*. The result is the dual antenna of FIG. 2*b*.

Figure 2B:
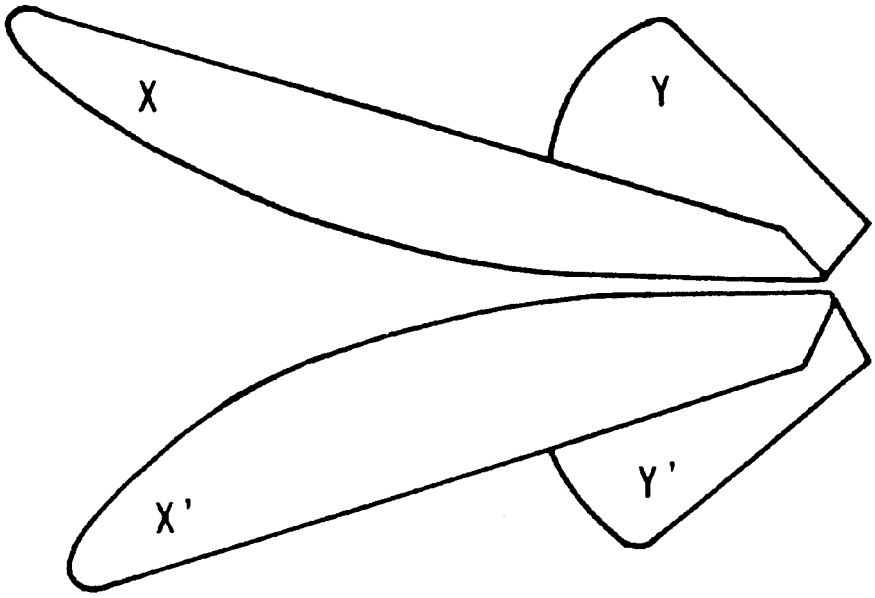
FIG. 2*b* illustrates the dual antenna.
Figure 3:
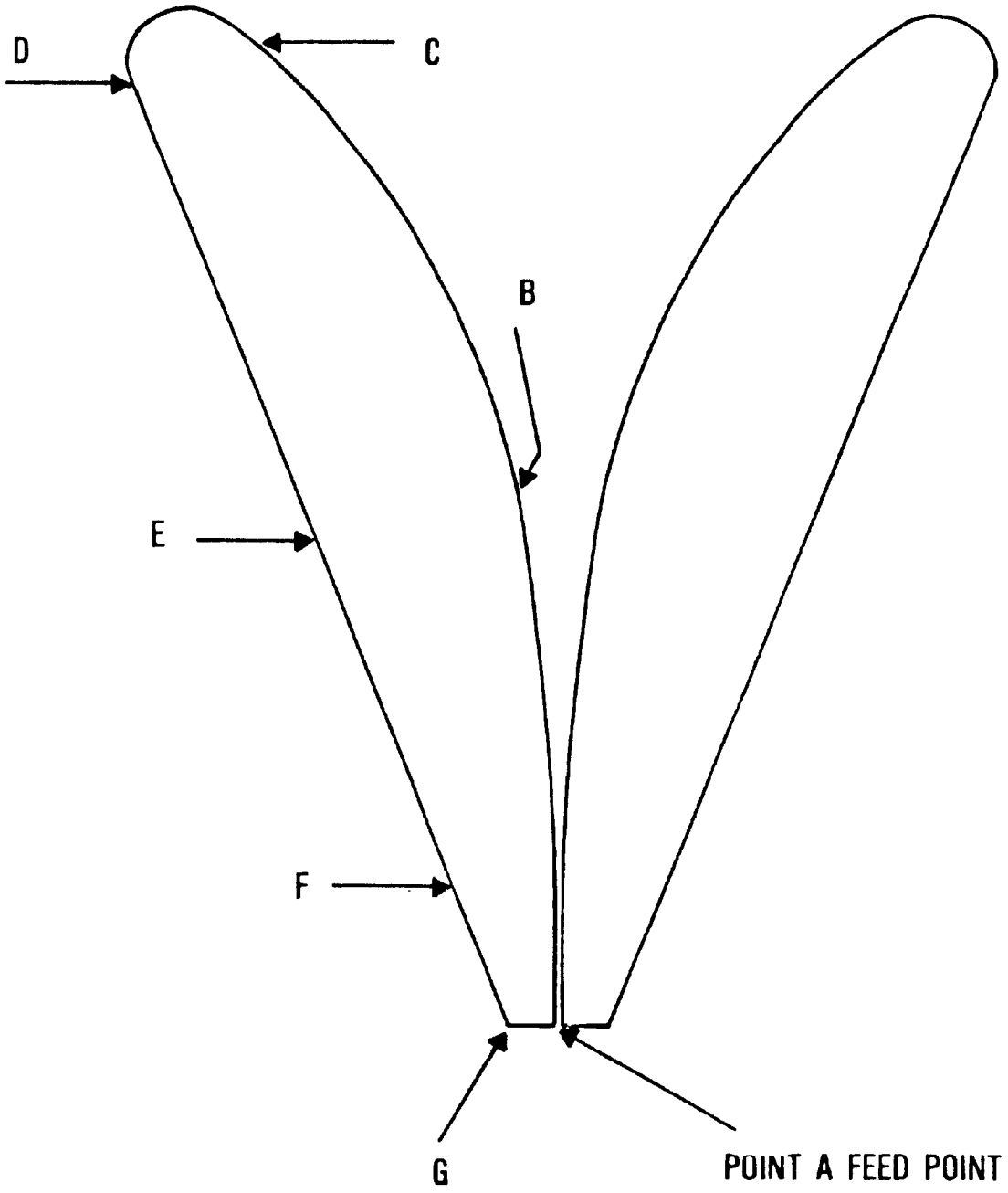
FIG. 3 illustrates the operation of the antenna of the present invention as a transmission line slot in a metal ground plane.

The pair of radiating elements XX' (XY) in FIG. 2*b* can be considered an angled, tapered, balanced transmission line slot in a metal ground plane, (See FIG. 3). The slot width increases approximately logarithmically from the throat (Point A) to the mouth (Point B) of the antenna. The slot transmission line has a transverse electromagnetic mode of propagation. To understand the radiation mechanism of the tapered balanced slot transmission line, consider the pair of radiating elements, which are fed with a 50 ohm coaxial line. The width and height of the slot at Point A is designed such that the surge impedance at Point A is exactly 50 ohms. The surge impedance is measured through the coaxial transmission line into the feed point of the slot transmission line at Point A, progressing through Point B, through Point C, onto Point D, (See FIG. 3).

FIG. 3 illustrates the operation of the antenna of the present invention as a transmission line slot in a metal ground plane. For a detailed description of conventional slot antennas, see Chapters 8 and 9 of "Antenna Engineering Handbook" by Henry Jasik and published by the McGraw Hill Book Company in 1961, the disclosure of which is incorporated by reference.

Figure 4:
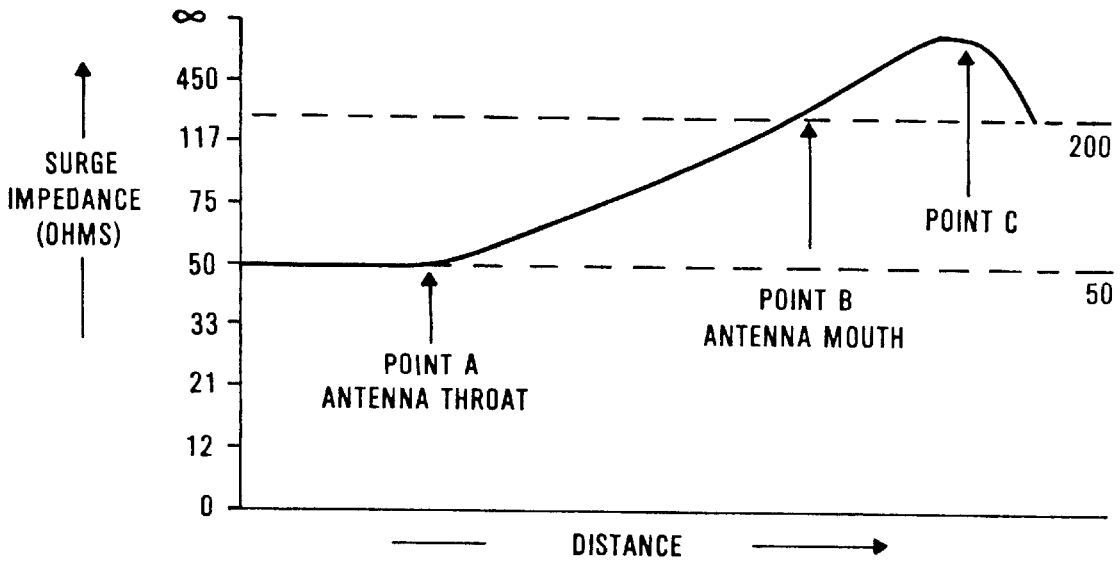
FIG. 4 is a facsimile of the antenna surge impedance through the transmission line and antenna.

FIG. 4 is a chart of the antenna surge impedance through the transmission line and antenna of the present invention. The surge impedance is measured with a Time Domain Reflectometer of similar apparatus. A desired Time Domain Reflectometer display of the surge impedance is seen in FIG. 4. The curvature of the radiating element going from Point B (the antenna mouth) to Point C is approximately an arc of constant radius. If the radius is too small, the slope of the curve in FIG. 4 from Point A to Point B will be excessive and provide unwanted reflections back to the input, thus causing a large input VSWR. If the radius is made too large, the physical size of the element becomes excessive, making the antenna large and bulky. The geometry of the element from Point C to Point D is an arc of constant radius. The design compromise which results in the configuration seen in FIG. 1 provides an overall tradeoff between antenna geometry, physical size, and VSWR. The physical shape of the radiating element from Point D to Point E to Point F to Point G is relatively unimportant and is a straight line for manufacturing ease. The distance from Point G to Point H is made at least ten times the amount of the slot opening at Point A, the antenna throat, (See FIG. 3). This provides a containment of fringing of the electric field lines, while also providing mechanical rigidity.

Figure 5:
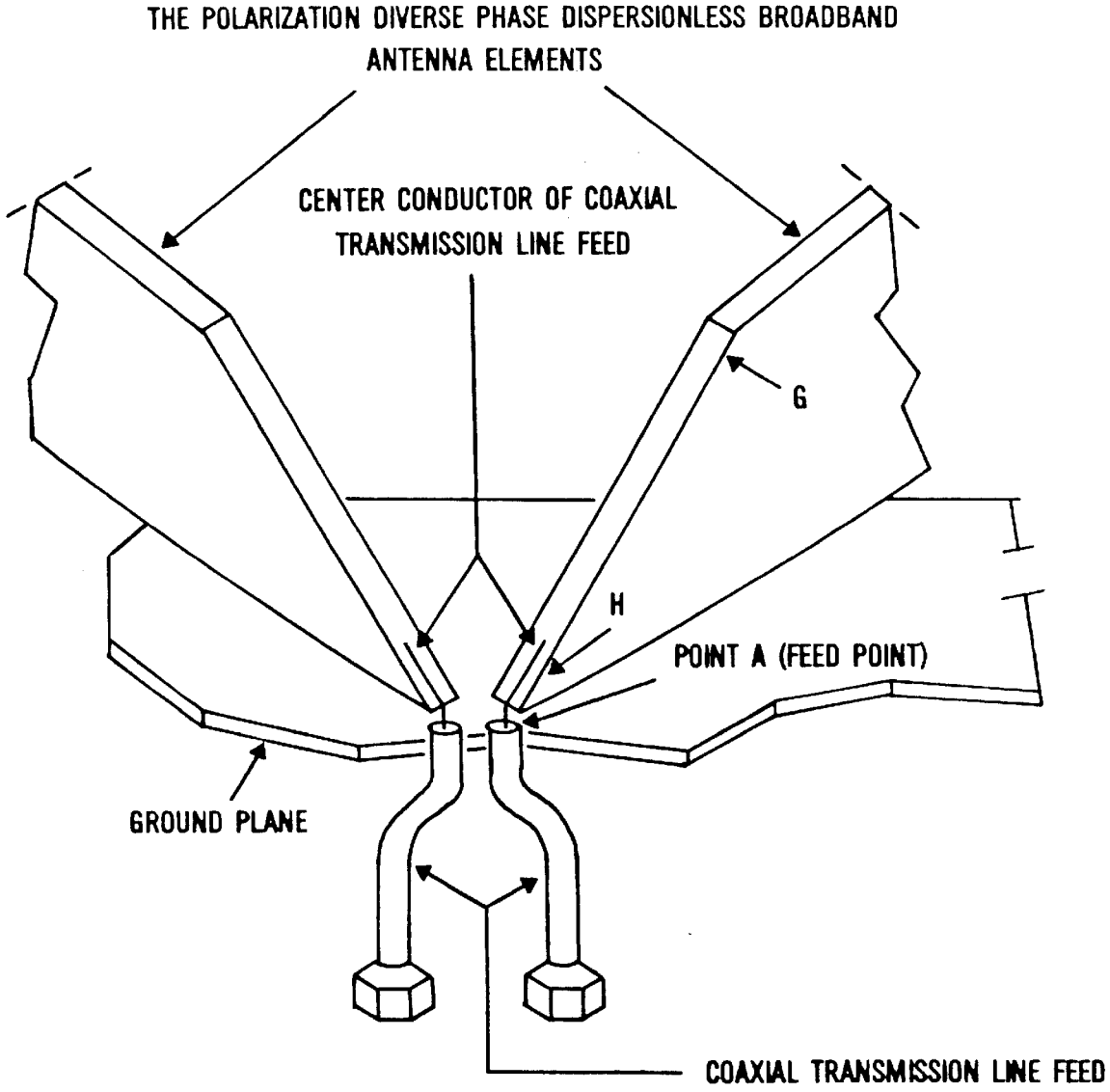
FIG. 5 details the feeding of the present invention.

The manner in which the Polarization Diverse Phase Dispersionless Broadband Antenna is fed with coaxial transmission line is described with the aid of FIG. 5. The outer conductor of the coaxial transmission line is secured (possibly soldered) to the ground plane. The center conductor of the coaxial transmission line is attached to the radiating element at Point H. The exact position is determined while inspecting the surge impedance with a Time Domain Reflectometer, such that the "surge impedance bump" is trimmed out. Both radiating elements are fed in this fashion.

The two coaxial feed cables are connected to the output ports of a broadband magic tee (180 degree hybrid coupler). When an RF signal is applied to the sum port of the magic tee, the two radiating elements are fed in phase, the electric field extends from the radiating element to the ground plane, and a vertically polarized waveform is radiated, (See FIG. 6).

Figure 6:
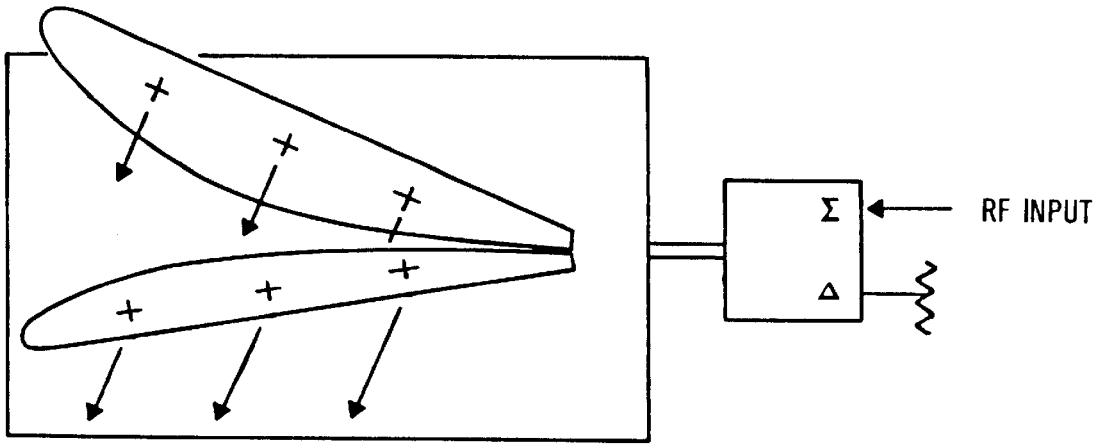
Figure 7:
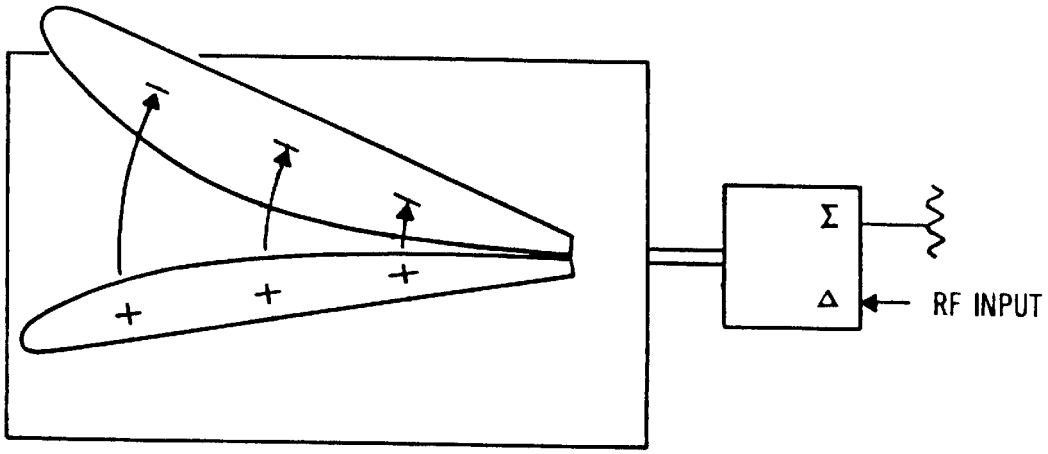

When an RF signal is applied to the difference port, the two radiating elements are fed in antiphase, (180 degrees out of phase), and a horizontally polarized waveform is radiated, (See FIG. 7). When the same signal is applied to the sum port and the difference port of the magic tee, a 45 degree linearly polarized waveform is radiated. If one of the inputs in FIG. 6 or FIG. 7 is phase shifted by 90 degrees with respect to the other, a circularly polarized waveform is radiated.

The fact any polarized waveform can be radiated from the Polarization Diverse Phase Dispersionless Broadband Antenna by employing only one phase shifter is another very important feature. For the reception or radiation of electromagnetic energy, this antenna system saves a considerable amount of money on construction and maintenance cost over other available broadband antennas. The simplified feed structure for polarization diversity provides an additional cost savings. The antenna configuration including this unique feed is illustrated in FIG. 8. Different polarizations are obtained as the amount of the phase shift is varied, and some different values of phase shift and the corresponding polarization are listed in FIG. 8. The variable phase shifter is the only additional component required to obtain all different polarizations, unlike conventional antennas, which require variable attenuators as well.

The manner in which the radiating elements are supported can vary according to the particular application. The elements should be mounted such that no metal be placed near the regions of Point A, or Point B, or Point C, or Point D in FIG. 3. The support structure is generally found to work well when the elements are supported anywhere along the straight edge between Point E and Point F. The antenna in FIG. 1 is structurally superior to the dual antenna shown in FIG. 2*b,* and can easily be employed in a phased array configuration. Also, the coaxial transmission line is the ideal feed for the Polarization Diverse Phase Dispersionless Broadband Antenna due to its geometry and because the coaxial transmission line is phase dispersionless.

Figure 9:
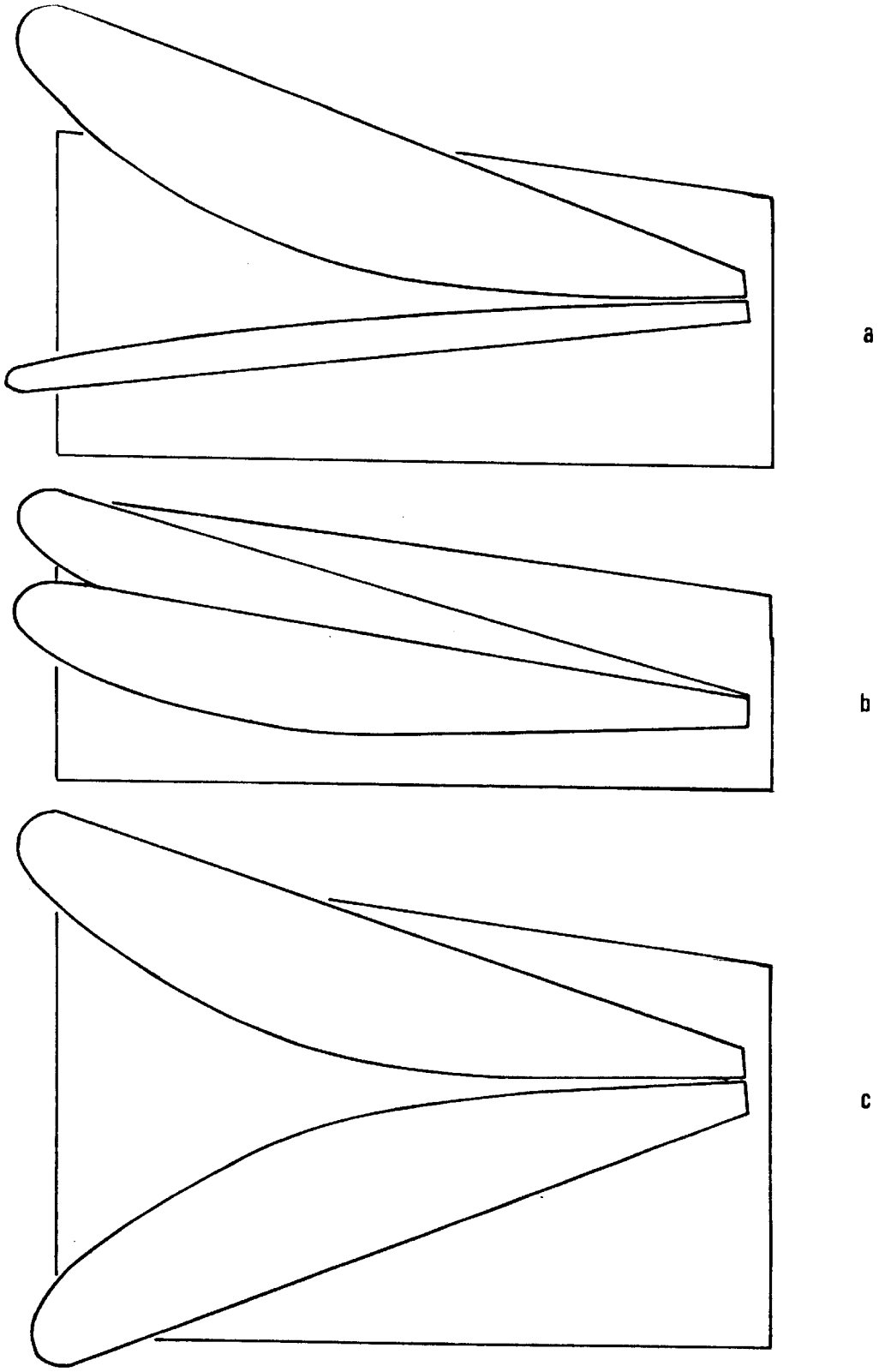
FIG. 9 illustrates three different geometries of the blade elements orientation in the antenna.

Three different geometries of the Polarization Diverse Phase Dispersionless Antenna are illustrated in FIG. 9. The antenna in FIG. 9*a* is described above. The antennas in FIGS. 9*b* and 9*c* operate in a fashion similar to the antenna in FIG. 9*a,* but the different geometries lend themselves to applications where different structural requirements exist. The antenna in FIG. 9*b* is composed of a slot transmission line above a ground plane for radiating vertical polarized energy, and a diverging plate transmission line for radiating horizontal polarized energy. The geometry and position of the radiating elements is chosen to force the surge impedance to increase linearly from the throat to the mouth of the antenna for both the slot transmission line (for vertical polarization) and the diverging plate transmission line (for horizontal polarization). The antenna configuration in FIG. 9*c* is the same as in FIG. 9*b,* except that the slot transmission line and the diverging plate transmission line are interchanged for the vertical and horizontal polarization respectively.

For a typical example, the Polarization Diverse Phase Dispersionless Antenna with dimensions:

Element Length: 23 inches;

Mouth Opening; 12 inches;

Element Thickness: 0.1 inches; has the measured performance of:

Frequency: 8 GHz;

Gain: 19.1 dB;

Vertical Beamwidth: 19 degrees;

Horizontal Beamwidth: 17 degrees;

VSWR: 1.16 to 1;

Polarization Isolation: 35.2 dB.

From March through May 1985 three experimental antennas were built: one each corresponding to those of FIGS. 9*a*, 9*b*, and 9*c*. Measurements made at the Verona Test Site with a Time Domain Reflectometer gave excellent results, indicating both a low VSWR (Voltage Standing Wave Ratio) and the linear surge impedance versus distance characteristics seen in FIG. 4. The two prototype antennas in FIGS. 9*a* and 9*c* are being tested, obtaining spatial patterns and polarization responses at UHF-Band, L-Band, S-Band, C-Band, X-Band, and K-Band, to demonstrate the extremely broadband performance of these antennas. These bands are presented below in Table 1.

TABLE 1

| Frequency Band | Frequency |
|---|---|
| UHF | 300–1,000 Mc |
| L | 1,000–2,000 Mc |
| S | 2,000–4,000 Mc |
| C | 4,000–8,000 Mc |
| X | 8,000–12,500 Mc |
| K | 18–26.5 Gc |

The Polarization Diverse Phase Dispersionless Broadband Antenna will radiate and receive electromagnetic energy at UHF-Band, L-Band, S-Band, C-Band, X-Band, K-Band and beyond. Furthermore, the antenna has excellent time dispersion properties (i.e., dispersionless) over an extremely broadband of operation. The antenna is polarization diverse, i.e., horizontally polarized, or vertically polarized, or circularly polarized, or elliptically polarized. Also, polarization diversity is obtained using only a single variable phase shifter, making dual polarization easy to implement in new radar systems. This antenna design lends itself to stacking or arraying to form a large phased array for many different applications.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An antenna comprising:

a metal ground plane;

first and second blade antenna elements fixed in proximity with each other above said metal ground plane;

first and second coaxial transmission line feeds each having a central conductor respectively connected to the first and second blade antenna elements; and a means of feeding signals with controlled phase into said first and second coaxial transmission line feeds.

2. An antenna, as defined in claim 1, wherein said first and second blade antenna elements each comprise:

a blade element which has a throat, a mouth, and a tip, said throat serving as a feed point and being electrically connected to a central conductor of one of said first and second transmission line feeds, said throat being comparatively narrow compared to other portions of the blade element, said mouth being a mid-section of said blade element and also the blade element's widest section, said tip being an arc of constant radius, said tip thereby resulting in a low voltage standing wave ratio of about 1.119 to 1.

3. An antenna, as defined in claim 2, wherein said means of feeding signals comprises a 180° hybrid coupler which is electrically connected with said coaxial transmission line feeds, said 180° hybrid coupler having a sum and difference port such that when a single radio frequency signal is fed into the sum port, the first and second blade antenna elements are fed in phase and a vertically polarized waveform results, when a single radio frequency signal is applied to the difference port, the first and second blade elements are fed in antiphase (180° out-of-phase) and a horizontally polarized waveform results, and when a same radio frequency signal is applied to both the sum and difference port, a 45° linearly polarized waveform results.

4. An antenna, as defined in claim 3, wherein said antenna includes an array of first and second blade antenna elements fixed in proximity with each other above said metal ground plane, and fed with a plurality of first and second coaxial transmission line feeds.

5. An antenna, as defined in claim 4, wherein said first and second blade antenna elements each has a length of about twenty two inches, a mouth width of about seven inches, and a width of about 0.1 inches.

* * * * *